US012650115B2

(12) United States Patent
Oh et al.

(10) Patent No.: US 12,650,115 B2
(45) Date of Patent: Jun. 9, 2026

(54) HALL-EFFECT THRUSTER SYSTEM WITH APPLIED COUNTER-TORQUE

(71) Applicant: The Regents of the University of Michigan, Ann Arbor, MI (US)

(72) Inventors: Braden Oh, La Canada, CA (US); Mahderekal Regassa, Wellesley, MA (US); Avery Clowes, Bolton, MA (US); Grant Miner, Fremont, CA (US); Albert Countryman, Oakland, CA (US); Nathan Cantrell, Dracut, MA (US); Lucas Ewing, Brighton, MA (US); Christopher Lee, Needham, MA (US); Marissa Klein, Charlottesville, VA (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 20 days.

(21) Appl. No.: 18/802,838

(22) Filed: Aug. 13, 2024

(65) Prior Publication Data

US 2024/0401576 A1      Dec. 5, 2024

Related U.S. Application Data

(63) Continuation-in-part of application No. 18/196,017, filed on May 11, 2023.
(Continued)

(51) Int. Cl.
*F03H 1/00* (2006.01)
*B64G 1/40* (2006.01)

(52) U.S. Cl.
CPC ........... *F03H 1/0062* (2013.01); *B64G 1/413* (2023.08)

(58) Field of Classification Search
CPC ........ B64G 1/405; B64G 1/402; B64G 1/413; F03H 1/0037; F03H 1/0075; F03H 1/0012; F03H 1/0062; F03H 1/0068; F02K 9/52
See application file for complete search history.

(56) References Cited

U.S. PATENT DOCUMENTS

| 5,646,476 A | 7/1997 | Aston |
| 5,973,447 A | 10/1999 | Mahoney et al. |
| | (Continued) | |

FOREIGN PATENT DOCUMENTS

| EP | 1995458 B1 | 1/2013 |

OTHER PUBLICATIONS

Screen captures from YouTube video clip entitled "Olin College Hall Thruster Test Fire," 4 pages, uploaded on Dec. 20, 2018 by user "Braden Oh". Retrieved from Internet: <https://www.youtube.com/watch?app=desktop&v=DPC2WJL_qrM>. pp. 1-3 show still frame side views of a Hall thruster during a test fire, and p. 4 shows still frame end views of the Hall thruster during the test fire.
(Continued)

*Primary Examiner* — Andrew H Nguyen
(74) *Attorney, Agent, or Firm* — Reising Ethington P.C.

(57) ABSTRACT

A Hall effect thruster system includes a thruster body and a diffuser configured to apply a torque to the thruster body during operation. The diffuser applies the torque by ejecting the propellant in a non-axial direction, such as a direction tangent to helical or curvilinear channels formed within a body of the diffuser. The applied torque can be used to counteract a swirl torque that is induced on the thruster body by the ionizing Hall current flowing in an annular channel of the thruster body. This effective counter-torque is useful in deep space applications outside the Earth's magnetic field.

17 Claims, 10 Drawing Sheets

Related U.S. Application Data

(60) Provisional application No. 63/340,566, filed on May 11, 2022.

(56) References Cited

U.S. PATENT DOCUMENTS

| | | | | |
|---|---|---|---|---|
| 11,346,330 | B1 * | 5/2022 | Xu | F03H 1/0075 |
| 2009/0293482 | A1 | 12/2009 | Davis, Jr. et al. | |
| 2012/0206045 | A1 * | 8/2012 | Marchandise | F03H 1/0012 |
| | | | | 315/111.41 |
| 2012/0311992 | A1 | 12/2012 | Ozaki et al. | |
| 2017/0248318 | A1 * | 8/2017 | Kulkarni | F23R 3/46 |
| 2017/0363294 | A1 | 12/2017 | Grooms et al. | |
| 2021/0148573 | A1 | 5/2021 | Jain | |
| 2022/0341595 | A1 * | 10/2022 | Kamoi | F23R 3/286 |

OTHER PUBLICATIONS

Oh et al., "Undergraduate Demonstration of a Hall Effect Thruster: Self Directed Learning in an Advanced Project Context," Student Paper, 127th ASEE Annual Conference, Jun. 22, 2020, 21 pages, American Society for Engineering Education, published on-line.

Xia et al., "Effects of rotating supply mode on the ionization parameters of a krypton Hall thruster," Vacuum, Aug. 1, 2020, pp. 1-10, vol. 181, Elsevier Ltd., published on-line.

Xia et al., "Performance optimization of a krypton Hall thruster with a rotating propellant supply," Acta Astronautica, Mar. 18, 2020, pp. 290-299, vol. 171, Elsevier Ltd., published on-line.

Baird, et al., "Designing an Accessible Hall Effect Thruster," Honors Theses, 2697, Apr. 19, 2016, 66 pages, ScholarWorks@WMU, published on-line.

Hopping et al., "Small Hall Effect Thruster with 3D Printed Discharge Channel: Design and Thrust Measurements," Aerospace, Aug. 15, 2021, p. 227 (14 pages), vol. 8, MDPI (Basel, Switzerland), published on-line.

Hopping et al., "Design and Testing of a Hall Effect Thruster with 3D Printed Channel and Propellant Distributor," IEPC-2017-119 presented at 35th International Electric Propulsion Conference, Oct. 8, 2017, 9 pages, IEPC, Atlanta, GA, USA.

Bretti "Progress and Developments of Ultra-Compact 10 Watt Class Adamantane Fueled Hall Thrusters for Picosatellites," IEPC-2022-349 presented at 37th International Electric Propulsion Conference, Jun. 19, 2022, 25 pages, Electric Rocket Propulsion Society, published on-line.

Oh et al., "Design, fabrication, and testing of an undergraduate hall effect thruster," J. Electr. Propuls., Feb. 7, 2023, vol. 2, Art. 6, 22 pages, Springer Nature, published on-line.

Satpathy et al., "Propellant Utilization Efficiency of an Argon Hall thruster with Swirl Injection," International Electric Propulsion Conference, Jun. 23-28, 2024, 16 pages, IEPC-2024-376, Electric Rocket Propulsion Society, presented in Toulouse, France.

Oh et al., "Feasibility of All-Electric Three Axis Momentum Management for Deep Space Small Body Rendezvous," AIAA Propulsion and Energy Forum, 50th AIAA/ASME/SAE/ASEE Joint Propulsion Conference, Jul. 28-30, 2014, 14 pages(s), American Institute of Aeronautics and Astronautics, Inc., presented in Cleveland, OH, USA.

Ashkenazy, et al. "Torque Control of Hall Propelled Small Spacecraft," 26th International Electric Propulsion Conference, conference paper IEPC-99-183, Oct. 1999, 6 pages, Japan Society for Aeronautical and Space Sciences, presented at Kitakyushu, Japan.

Zhang Xu, et al., Effect of azimuthal diversion rail on an ATON-type Hall thruster, J. Phys. D: Appl. Phys., 2017, pp. 1-8.

Liang Han, et al., Mode transition induced by the magnetic field gradient in Hall thrusters, J. Phys. D: Appl. Phys., 2016, pp. 1-7.

* cited by examiner

HALL-EFFECT THRUSTER SYSTEM WITH APPLIED COUNTER-TORQUE

TECHNICAL FIELD

This disclosure is related to spacecraft thrusters and, in particular, to Hall-effect thrusters that provide propulsion via ionization and acceleration of a propellant in a direction away from the spacecraft.

BACKGROUND

Electric space propulsion engines are a class of propulsion engines that generate thrust by forming and ejecting ions at high velocities. Ions are often created by removing electrons from an otherwise electrically neutral propellant. Hall effect thrusters are a class of electric space propulsion engines that use electron bombardment as the mechanism for propellant ionization. Hall thrusters inject propellant into an annular channel within which propellant ionization and ion acceleration occurs. This propellant is often injected with the aid of a diffuser that serves to spread the propellant throughout the channel. The trajectory of the propellant as it exits the diffuser is significant because it influences how long the propellant ultimately remains inside the channel; increasing propellant lingering time (longevity) inside the channel increases the probability of ionization, which in turn increases thruster efficiency. Axial emission, which is a common injection method used in contemporary Hall thrusters, results in shorter longevity inside the thruster channel and thereby a lower thruster efficiency. For this reason, developing Hall thruster propellant diffusers that reduce axial velocity is advantageous.

SUMMARY

Embodiments of a Hall effect thruster system include a thruster body and a diffuser configured to eject ionizable propellant into an annular channel formed in the thruster body. A Hall current provided in the annular thruster channel induces a torque on the thruster body in a first rotational direction, and ejection of the propellant from the diffuser applies a counter-torque to the thruster body in a second rotational direction opposite the first rotational direction.

The thruster system may additionally include one or more of the following features in any technically feasible combination:

the diffuser ejects the propellant into the annular channel with a tangential velocity;

the diffuser includes curvilinear channels that each receive some of the propellant at an inlet end and eject the propellant into the annular channel at an outlet end;

the diffuser includes helical channels and ejects the propellant into the annular channel in directions tangent to the each of the helical channels;

the diffuser is affixed to the thruster body in the annular thruster channel and does not rotate with respect to the thruster body;

the diffuser is located in the annular thruster channel and is formed as a single continuous piece with the thruster body; and/or the counter-torque is applied to the thruster body without reversing a polarity of a magnetic field containing the Hall current in the annular thruster channel;

Embodiments of a Hall effect thruster system include a thruster body and a diffuser configured to eject ionizable propellant into an annular channel formed in the thruster body in a direction that applies a torque on the thruster body.

The thruster system may additionally include one or more of the following features in any technically feasible combination:

the torque is applied to the thruster body in a rotational direction opposite a rotational direction of a torque induced on the thruster body by a Hall current in the annular thruster channel;

the diffuser ejects the propellant into the annular channel with a tangential velocity to apply said torque;

the diffuser includes curvilinear channels that each receive some of the propellant at an inlet end and eject the propellant into the annular channel at an outlet end;

the diffuser includes helical channels and ejects the propellant into the annular channel in directions tangent to the each of the helical channels to apply said torque;

the diffuser is affixed to the thruster body in the annular thruster channel and does not rotate with respect to the thruster body;

the diffuser is located in the annular thruster channel and is formed as a single continuous piece with the thruster body; and/or the counter-torque is applied to the thruster body without reversing a polarity of a magnetic field containing the Hall current in the annular thruster channel.

Embodiments of a spacecraft include a Hall effect thruster system with any technically feasible combination of features of the above-listed systems.

Embodiments of a method of operating a spacecraft having a Hall thruster system include ejecting an ionizable propellant into an annular thruster channel of the system in a direction that counteracts a torque induced on the thruster system by a Hall current provided in the annular channel.

The direction in the step of ejecting may be a tangential direction relative to the annular channel, and/or the step of ejecting may include ejecting the propellant from a helical channel of a diffuser of the thruster system.

DETAILED DESCRIPTION

Described below is a mechanical diffuser which accepts a number of incoming propellant streams, divides these streams among a plurality of flows, and directs these flows to have an azimuthal trajectory upon being ejected into the annular channel of a Hall effect thruster within which propellant ionization and ion acceleration occurs. The plurality of flows serves to dispense the propellant evenly throughout the Hall thruster channel, while the azimuthal trajectory increases propellant longevity in the thruster channel, increasing the probability of propellant ionization when compared to conventional axial emission from the diffuser. The azimuthal ejection trajectory also imparts a reactionary torque on the diffuser which can be used as a counter-torque to at least partially counteract a Hall current-induced swirl torque. The diffuser may be constructed as a single, unitary component manufactured additively and having no moving components, reducing the likelihood of suboptimal or failed operation.

Figure 1:
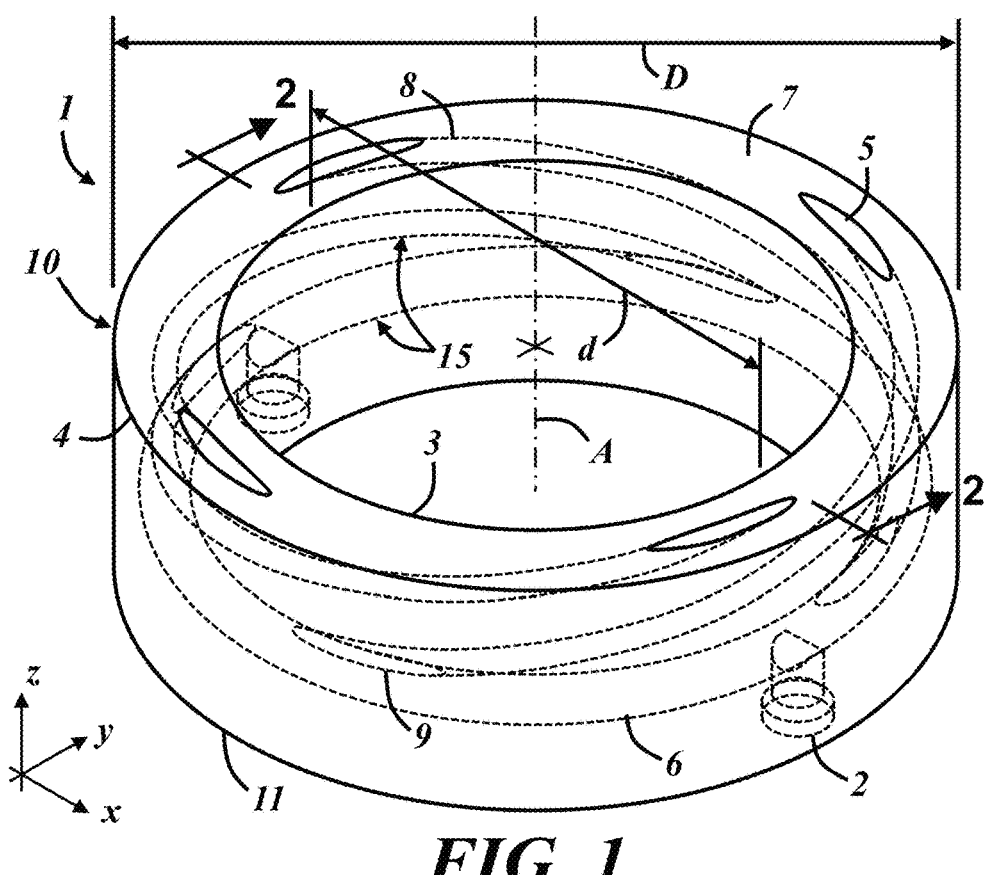
FIG. 1 is an isometric view of an illustrative diffuser for use in a Hall effect thruster system.
Figure 9:
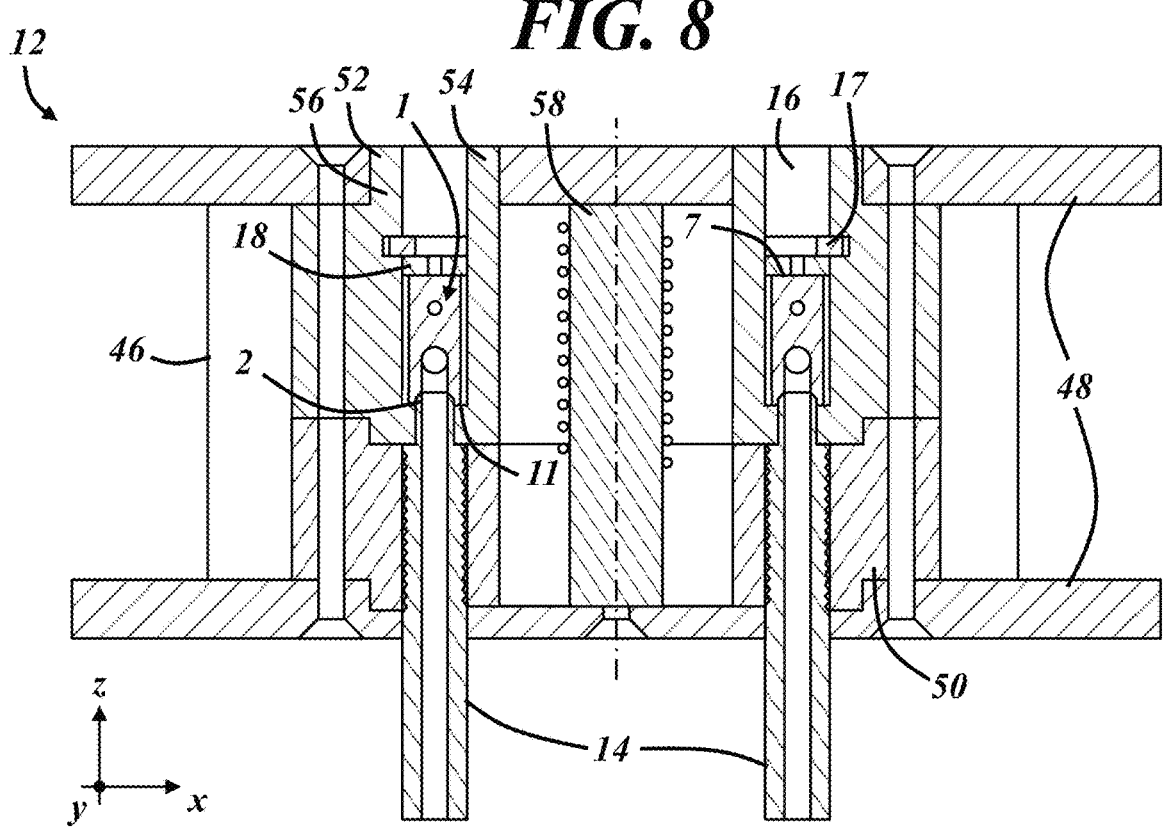
FIG. 9 is a cross-sectional view of the thruster system of FIG. 8.

FIG. 1 is an isometric view of a first embodiment of a propellant diffuser 1. The diffuser 1 is ring-shaped and includes a solid diffuser body 10—a rectangular toroid in this example—and a hollow internal flow geometry 15 formed within the solid diffuser body 10. A radially inner wall 3 of the diffuser body 10 is constrained at an internal or inner diameter d of the diffuser body 10. A radially outer wall 4 of the diffuser body 10 is constrained at an outer wall diameter D. Inlet holes 2 at an inlet end 11 of the diffuser body 10 are configured to connect to external propellant feed tubes 14, as shown in FIG. 9. Propellant flows from the external gas and/or liquid feed tubes 14 into the inlet holes 2, which ultimately connect to propellant channels 8 inside the diffuser body 10 as part of the hollow internal gas flow geometry 15 of the diffuser 1. Outlet ends 5 of the propellant channels 8 define a plurality of azimuthally spaced outlet holes at an outlet end 7 of the diffuser body 10, opposite the inlet end 11 of the diffuser body. The illustrated propellant channels 8 are curvilinear and, in this particular case, are helical An x-y-z coordinate system is included in FIG. 1 as a reference in later figures. The z-axis of the coordinate system is aligned with a central axis A of the diffuser 1, with the x- and y-axes being perpendicular thereto and defining a radially extending plane. As is customary, an "axial" direction is a direction parallel with a reference axis such as the central axis A, and a "radial" direction is a direction perpendicular to and extending through the reference axis. An "azimuthal" direction is a rotational, angular, or circumferential direction with respect to the reference axis A and within a plane perpendicular to the reference axis, unless otherwise indicated. A "tangent" direction is a direction perpendicular with the radial direction at any point along a curvilinear path.

When used as part of a Hall thruster system which incorporates center-mounted hardware, such as a hollow cathode or central magnetic poles, it may be advantageous to make the size of the hole through the center of the annular diffuser as large as possible. In this case, the diameter d of the hole through the center of the diffuser could be about 50-95% of the outer diameter D of the diffuser, or about 70-95%, or about 85-95%. Conversely, when used as a temperature managing component within a Hall thruster system it may be advantageous to make the size of the hole through the center of the annular diffuser as small as possible or remove the central hole entirely and use a set of smaller holes to accommodate specific hardware, such as bolts or magnetic poles. In this case, the diameter d of the hole through the center of the diffuser could be 0 to about 50% of the outer diameter D of the diffuser, or about 3-25%, or about 5-10%.

Figure 2:
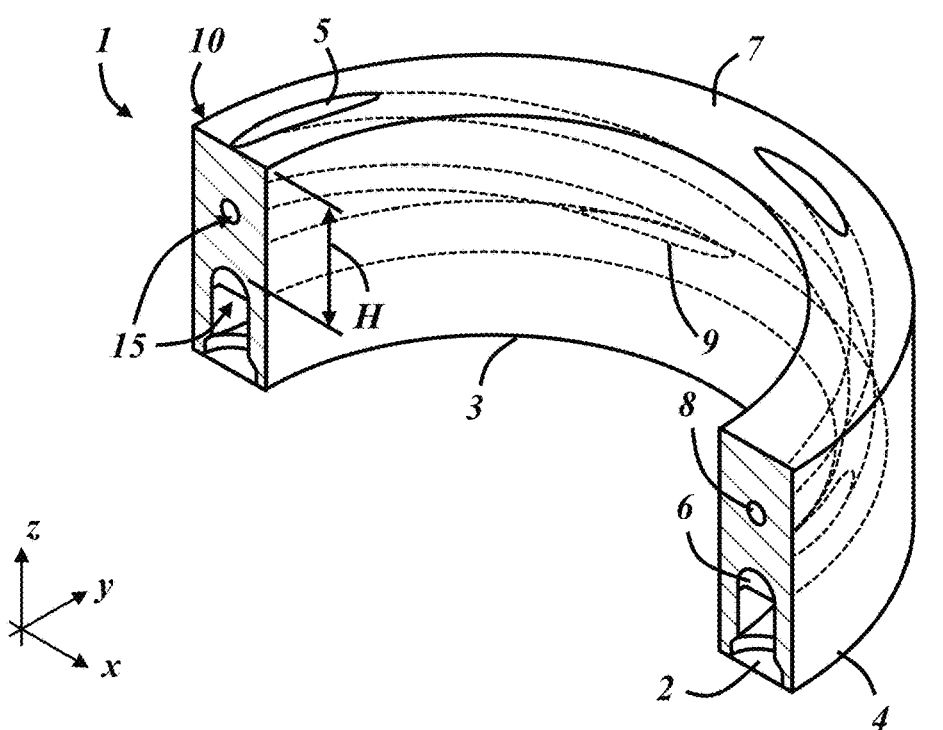
FIG. 2 is a cross-sectional isometric view of the diffuser of FIG. 1.

FIG. 2 is the same isometric view of FIG. 1 with a diametrically visible cross-section. The location of the cross-section highlights the plurality of propellant inlet holes or interfaces 2, of which the first embodiment contains two that are diametrically opposite from each other. These interfaces 2 accept propellant from propellant feed tubes 14 (FIG. 9) through a pipe insertion sealed by an adhesive, though other embodiments may feature different interfaces, including but not limited to screw threads. In the first embodiment, these interfaces 2 are centered between the inner and outer walls 3, 4 of the diffuser 1. These inlet interfaces 2 guide propellant into a plenum 6 formed within the solid diffuser body 10 as part of the hollow internal gas flow geometry 15. The illustrated plenum 6 is a toroidal cavity of uniform diameter and extends around the entire circumference of the diffuser 1. The radially inner and outer extents of the toroidal cavity or plenum 6 are enclosed by the inner and outer walls 3, 4 of the diffuser, respectively. Propellant flows into the plenum 6 through the inlet interfaces 2 and flows azimuthally to fill the interior of the plenum 6. As oriented in FIG. 1, an upper portion of the plenum 6 opens into a plurality of helical channels 8 that are each shaped like a portion of a helix, each of which has an inlet end 9 at the plenum 6 and an outlet end 5 opening on the outlet end 7 of the diffuser body 10—i.e. the upper surface of the diffuser 1, as oriented in FIG. 1.

The inlet openings 9 of the channels 8 are azimuthally spaced and have a shape driven by the intersection between the helical channels 8 and the toroidal plenum 6 to allow propellant to flow from the plenum 6 into the helical channels 8. The helical channels 8 coil away from the plenum 6 and toward the outlet end 7 of the diffuser body 10, maintaining constant internal radii and a constant radial distance from the central axis A of the diffuser 1 in the first embodiment. The helical channels 8 are visible in FIG. 2 as two small circular holes in the cross-sectional face. These channels 8 are constrained by the bulk material of the diffuser body 10, which bulk material fully encloses the channels and extends outwardly to the outer wall 4 and inwardly to the inner wall 3 of the diffuser 1. The shapes of the openings that the outlet ends 5 of helical channels 8 make on the top face of the diffuser are driven by the intersection between the helical channels 8 and the radially extending plane at the outlet end 7 the diffuser 1. These openings serve as outlets that allow the propellant to exit the diffuser with a largely azimuthal trajectory.

Figure 8:
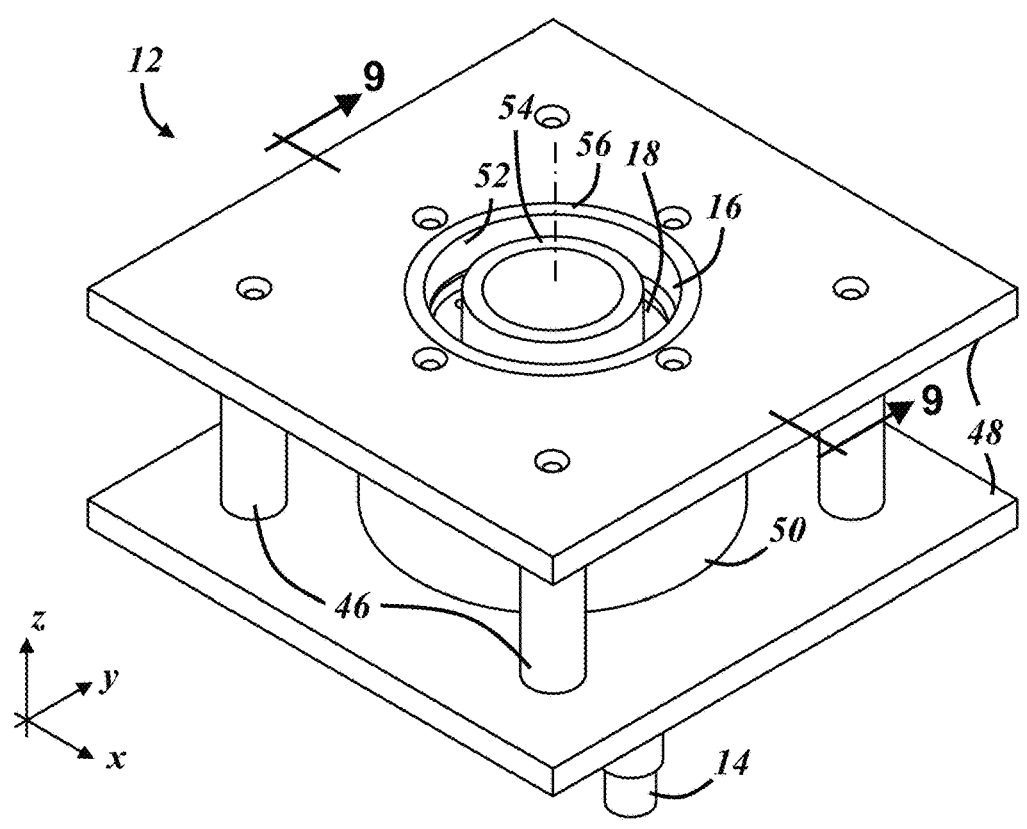
FIG. 8 is an isometric view of a Hall effect thruster system including the diffuser of FIGS. 1 and 2.

The inner helical geometry may be optimized to maximize the azimuthal flow of the propellant and thereby increase longevity of the propellant inside the channel 16 of a Hall thruster when the diffuser 1 is incorporated into a larger Hall thruster system 12 (an example of which is depicted in detail in FIGS. 8 and 9). More specifically, the pitch of the helical tubes 8 may be configured to be as low as reasonably possible so as to minimize the axial velocity of propellant particles (and thereby maximize the azimuthal velocity). This may be done by revolving the helical channels through 0-100% or about 1-85% or about 2-75% of the 360 degrees of the diffuser. The embodiment shown in FIGS. 1 and 2 uses a helical revolution of 50% (i.e., the angular spacing between the inlet end 9 and outlet end 5 of each helical tube 8 is 180 degrees) with a height H of 10.14 mm, corresponding to an angle of elevation θ (FIG. 4) of approximately 8.64 degrees. The primary bounding condition on the minimum pitch is the thickness of the bulk material of the diffuser body 10 between channels 8. The material and manufacturing process will set this constraint, as will the number of channels.

Figure 3:
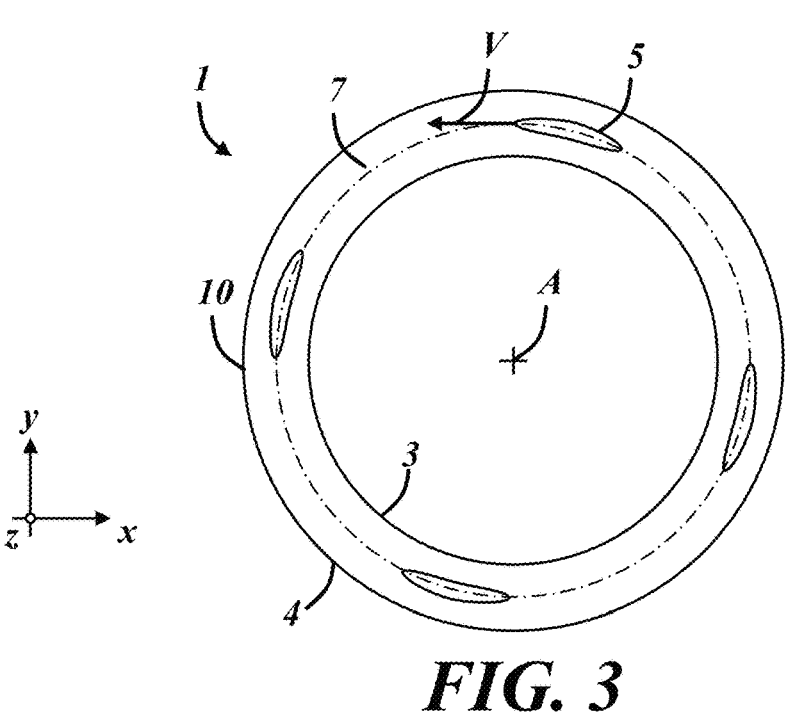
FIG. 3 is an axial view of an outlet end of the diffuser of FIGS. 1 and 2.

FIG. 3 is a top view of the diffuser 1 of FIGS. 1 and 2 and shows an axial end face of the outlet end 7 of the diffuser body 10. The inner wall 3 and the outer wall 4 of the diffuser 1 are marked accordingly. The first embodiment features two inlet holes 2 (FIG. 5) and four azimuthally spaced outlet holes defined at the outlet ends 5 of the helical tubes 8. An example of the above-referenced tangential velocity V at which propellant is ejected into the annular cavity of a Hall effect thruster system is also depicted in FIG. 3.

Figure 4:
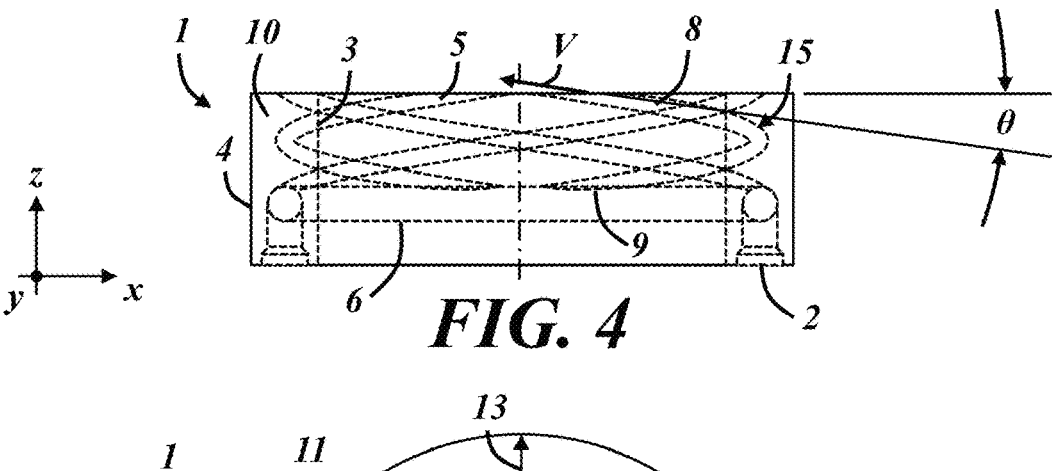
FIG. 4 is a side view of the diffuser of FIGS. 1 and 2.

FIG. 4 is a side view of the diffuser 1 of FIGS. 1-3 with the hollow internal flow geometry 15 denoted by dotted lines. The velocity V has a tangential component much larger than its axial component, as is apparent in FIG. 4, due to the shallow angle θ of the helical channels 8. The inlet holes 2 are visible between the inner and outer walls 3, 4 of the diffuser towards the sides of the diagram. The toroidal plenum 6 visibly connects with the inlet holes 2 and is depicted as a rectangle in this view because it wraps azimuthally around the entire diffuser 1. From the plenum 6, the helical channels 8 begin at inlet ends 9, coiling helically through the diffuser body 10 to the top face and outlet ends 5. All of these features of the hollow internal flow geometry 15 are defined within the bulk material of the diffuser body 10, which is constrained by the axial end faces of the outlet and inlet ends 7, 11 and also by the inner and outer walls, 3 and 4 respectively.

Figure 5:
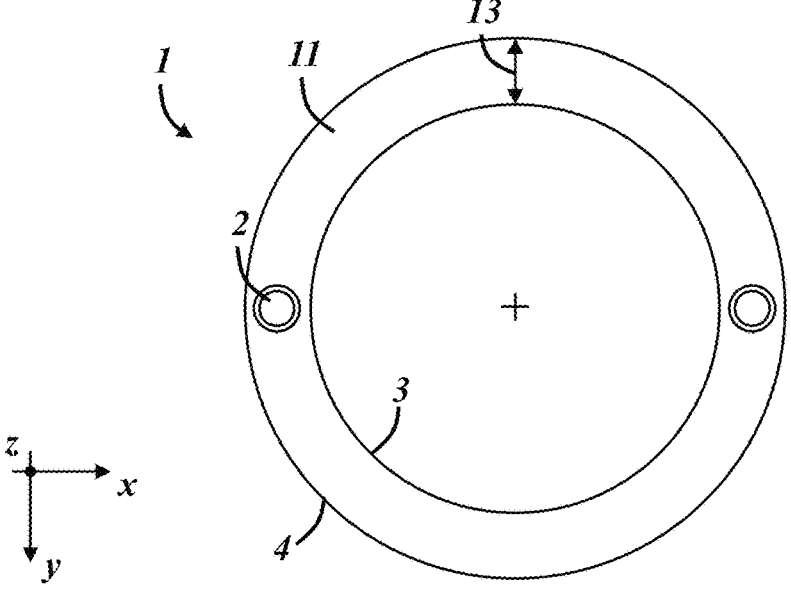
FIG. 5 is an axial view of an inlet end of the diffuser of FIGS. 1 and 2.

FIG. 5 is a bottom view of the diffuser 1 of FIGS. 1-4 and shows the axial end face of the inlet end 11 and radial thickness 13 of the diffuser. The inlet holes 2 are visible on the bottom surface and evenly spaced azimuthally in the first embodiment. This embodiment is particularly well-suited for use with a gaseous propellant.

Figures 6A, 6B, 7A, 7B:
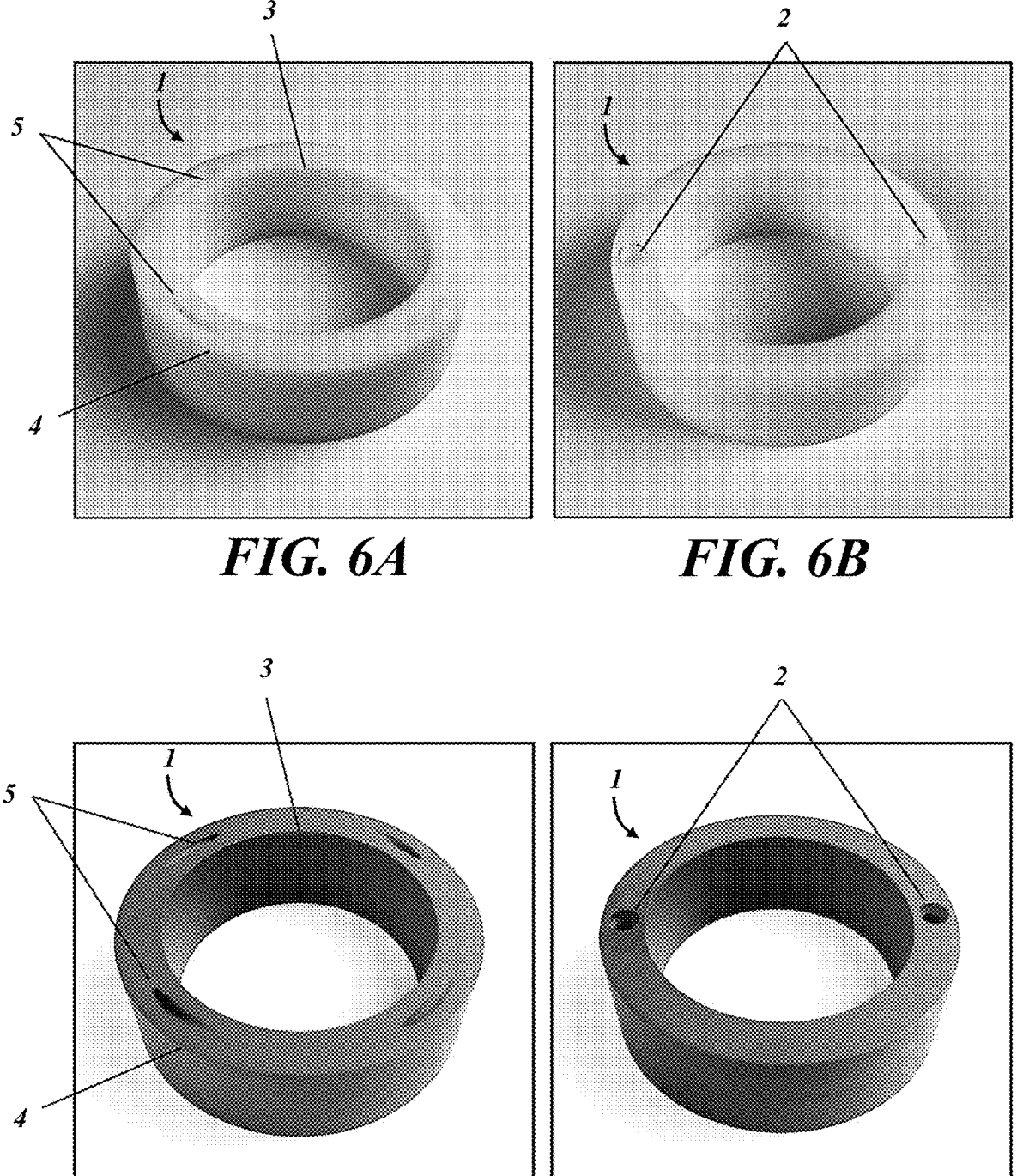
FIG. 6A is a photograph of the outlet end of a prototype of the diffuser of FIGS. 1 and 2.
FIG. 6B is a photograph of the inlet end of the diffuser of FIG. 6A.
FIG. 7A is a photograph of the outlet end of another prototype of the diffuser of FIGS. 1 and 2.
FIG. 7B is a photograph of the inlet end of the diffuser of FIG. 7A.

The helical channels 8 and the toroidal plenum 6 are hollow cavities of the hollow internal flow geometry 15 fully defined within the bulk material of the diffuser body 10 and thus are very difficult to manufacture with traditional subtractive manufacturing techniques. Additive manufacturing, however, may be used to manufacture the diffuser 1 by building up the bulk material of the diffuser body 10 around the requisite hollow features, enabling the manufacture of geometries impossible by traditional subtractive manufacturing techniques. Images of two versions of the first embodiment—each produced via additive manufacturing—are depicted in FIGS. 6A, 6B, 7A and 7B. FIGS. 6A-6B depict the first version of the first embodiment in a top view (FIG. 6A) and bottom view (FIG. 6B). This version was manufactured via stereolithography (SLA). SLA manufacturing is a photochemical-based process in which light is used to cause liquid chemical monomers (or prepolymers) to harden into solid polymers. FIGS. 7A and 7B depict the second version of the first embodiment in a respective top view and bottom view. This prototype was manufactured additively using selective laser melting (SLM). SLM is a sintering based process in which a laser is used to heat powder to a temperature where the material particles are able to melt and fuse together. The version depicted in FIGS. 7A and 7B was manufactured by laser sintering an aluminum alloy and then was subjected to sulfuric anodization to generate an electrically insulative oxide layer on the surface. Other potential post-treatments after additive manufacturing include, but are not limited to, conversion coating, galvanization, electroplating, powder coating, heat treatment, glazing, thermoplastic coating and thermoset coating. Other potential techniques that may be used to manufacture this diffuser include, but are not limited to, vat polymerization (including SLA), material jetting, binder jetting, material extrusion (including additive welding), powder bed fusion (including SLM), sheet lamination, directed energy deposition, and injection molding with post-processing fusion. Materials that may be used to manufacture this diffuser include, but are not limited to graphite, metal (including aluminum, iron, steel, Inconel, Hastelloy, titanium, tantalum, and molybdenum), ceramic (including boron nitride) and polymers, including thermoplastic, and/or thermoset materials, including thermoplastic elastomers.

FIG. 8 is an isometric view of an embodiment of a Hall effect thruster system 12 containing the diffuser 1 shown in the previous figures. The system 12 shown includes a plurality of electromagnets 46, a magnetic shunt 48, a spacing component 50, a thruster body 52 with inner and outer walls 54, 56 defining a Hall thruster channel 16, inlet flow tubes 14, a diffuser constraining assembly 17 (FIG. 9), and a thruster anode 18. The diffuser 1 sits inside the Hall thruster channel 16 of the thruster body 52 beneath the axial constraining assembly 17 and thruster anode 18. FIG. 9 is a cross-sectional view of the system 12 of FIG. 8, with the first embodiment of the diffuser 1 visible. In this embodiment, two propellant feed tubes 14 extend through openings in the thruster body 52 along the back (i.e., bottom) of the thruster channel 16 and into the diffuser inlet holes 2. The system 12 is configured to constrain both the radial and rotational motion of the diffuser 1 inside the depicted channel 16. The diffuser 1 is axially constrained on the inlet end 11 by the thruster channel 16, on the outlet end 7 by the constraining assembly 17 and thruster anode 18, and rotationally by the propellant tubes 14. In this manner, no fasteners are required to constrain the diffuser 1 within the Hall thruster channel 16 or system 12, but additional embodiments of the diffuser may require fasteners. FIG. 9 also schematically illustrates a central electromagnetic 58.

Figure 10:
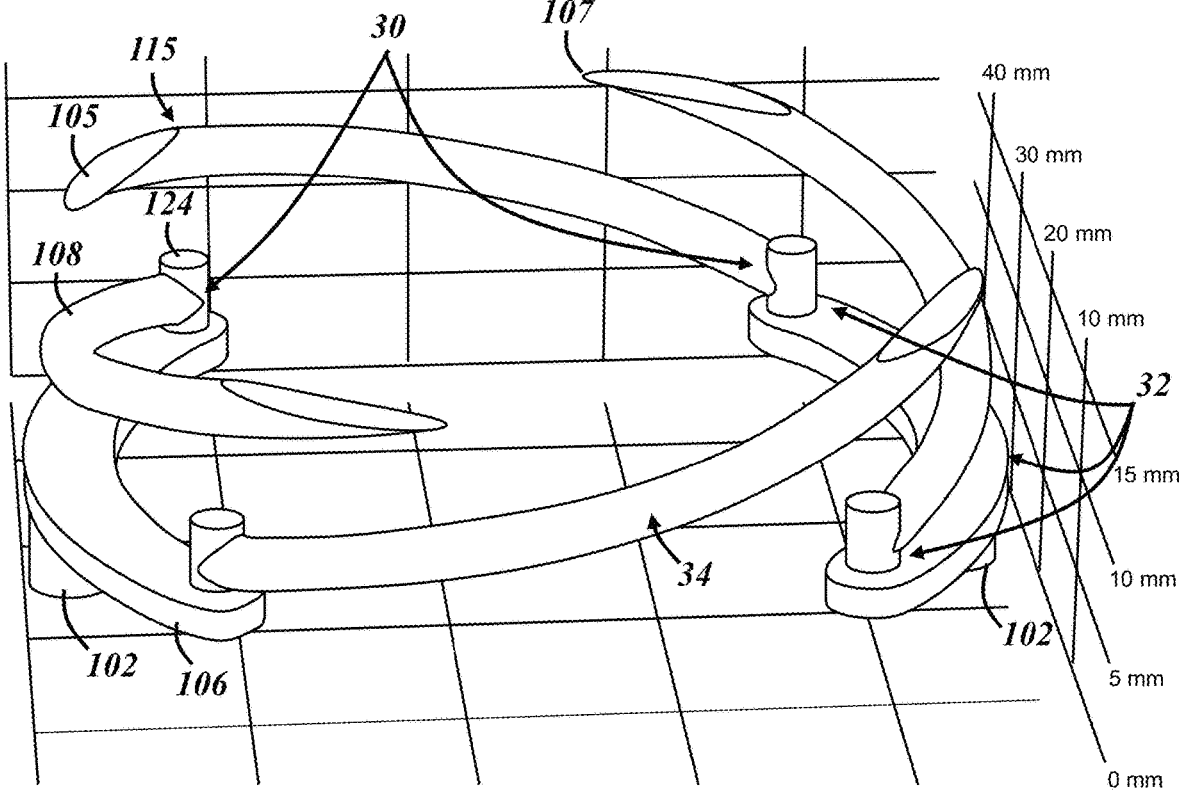
FIG. 10 is an isometric view of an embodiment of a hollow internal flow geometry of a diffuser for use in a Hall effect thruster system.

FIG. 10 depicts the hollow internal flow geometry 115 of a second embodiment of the diffuser and pressure regions of a gaseous propellant flowing through it. This embodiment contains two inlet holes 102, each of which opens into a plenum 106 having a rectangular cross-section revolved part way around the main axis of the diffuser. At either end of each plenum 106 is an axially extending cylindrical cavity 124 which extends towards the outlet end 107 of the diffuser. Each cylindrical cavity 124 serves as a fluid connector between the plenums 106 and each of a plurality of helical tubes 108 that revolve around the main axis of the diffuser while extending towards their respective outlet ends 105 at the outlet end 107 of the diffuser. These helical tubes 108 intersect the top plane of the diffuser body to form outlet holes at their outlet ends 105 through which propellant can exit the diffuser. All of these features (102, 106, 108, 124) are cavities defining the hollow internal flow geometry 15 of the diffuser which are constrained by the bulk material of the diffuser body and, as such, form a set of fluidly connected paths through which propellant can flow from the inlet holes 102 to the outlet holes 105. Functionally, features 102, 106, 108, 105 in the second embodiment serve the same roles as features 2, 6, 8, and 5 in the first embodiment, respectively. In this figure, based on a simulation of inlet flow, regions of low pressure 30, regions of high pressure 32, and flow trajectories 34 were identified to confirm that pressure gradients and azimuthal trajectories successfully form within the diffuser cavities.

In various embodiments, the diffuser has 2 to 500, 2 to 250, or 4 to 125 openings where outlet ends 5, 105 of the channels open on a surface of the outlet end 7 of the diffuser body 10 to provide for more even distribution of propellant. The diffuser may have 1 to 10 or 1 to 4 inlet openings 2, 102.

The radial thickness 13 (FIG. 5) may fall within the range of about 0.1 cm to 100 cm. Small thrusters typically have a radial thickness of about 0.2 cm to 10 cm, about 0.5 cm to 5 cm, or about 1 cm to 2 cm. Large thrusters typically have a radial thickness of about 1 cm to 50 cm, about 2 cm to 20 cm, or about 3 cm to 10 cm. The diameter D of the outer wall 4 may fall within the range of about 1 cm to 500 cm. Small thrusters typically have an outer wall diameter D of about 2 cm to 100 cm, about 3 cm to 50 cm, or about 3 cm to 15 cm. Large thrusters typically have an outer wall diameter D of about 10 cm to 150 cm, about 10 cm to 100 cm, or about 12 cm to 50 cm. The distance between the outlet end 7 and inlet end 11 faces may fall within the range of about 0.5 cm to 50 cm, about 0.75 cm to 10 cm, or about 1 cm to 5 cm. In various embodiments, the cross-section of the plenum 6, 106 is circular, oblong, elliptical, rectangular, or has another polygonal shape.

In various embodiments, the angle of elevation θ of the helical channels 8, 108 is in the range of about 2 to 60 degrees, about 5 to 30 degrees, or about 8 to 13 degrees. In some cases, the diameters of the helical channels range from about 0.1 mm to about 10 cm, or about 1 mm to about 1 cm. In embodiments, the cross-section of the helical channels is circular, oblong, elliptical, rectangular, or has another polygonal shape.

One method of making the diffuser is by additive manufacturing. The dimensions of the channels and openings in the diffuser are selected based on the properties of the materials and manufacturing process used. Minimum feature size and wall thickness are two driving parameters of diffuser feature dimensions. These parameters are reported by individual manufacturers for materials and manufacturing techniques they use. In the embodiment shown in FIG. 1, for a ceramic diffuser, a minimum wall thickness of 0.889 mm was used, a plenum diameter of 3 mm was used, and helical channels of diameter 1.5 mm were used. In some cases, for a ceramic diffuser used in combination with a gaseous propellant, the minimal wall thickness may be in the range of about 0.7 to about 5 mm, or about to about 2 mm, the plenum diameter may be in the range of about 2 mm to about 6 mm, or about 3 to about 4 mm, and the diameter of the helical channels may be about 0.3 mm to about 2.5 mm, or about 1 mm to about 2 mm. These parameters are not limiting.

While the illustrated diffuser is a unitary component, i.e. it is manufactured as a single, one-piece component, the diffuser alternatively can be made by forming sub-components which are fused, fastened, clamped, or otherwise attached together.

Example 1

Figure 11:
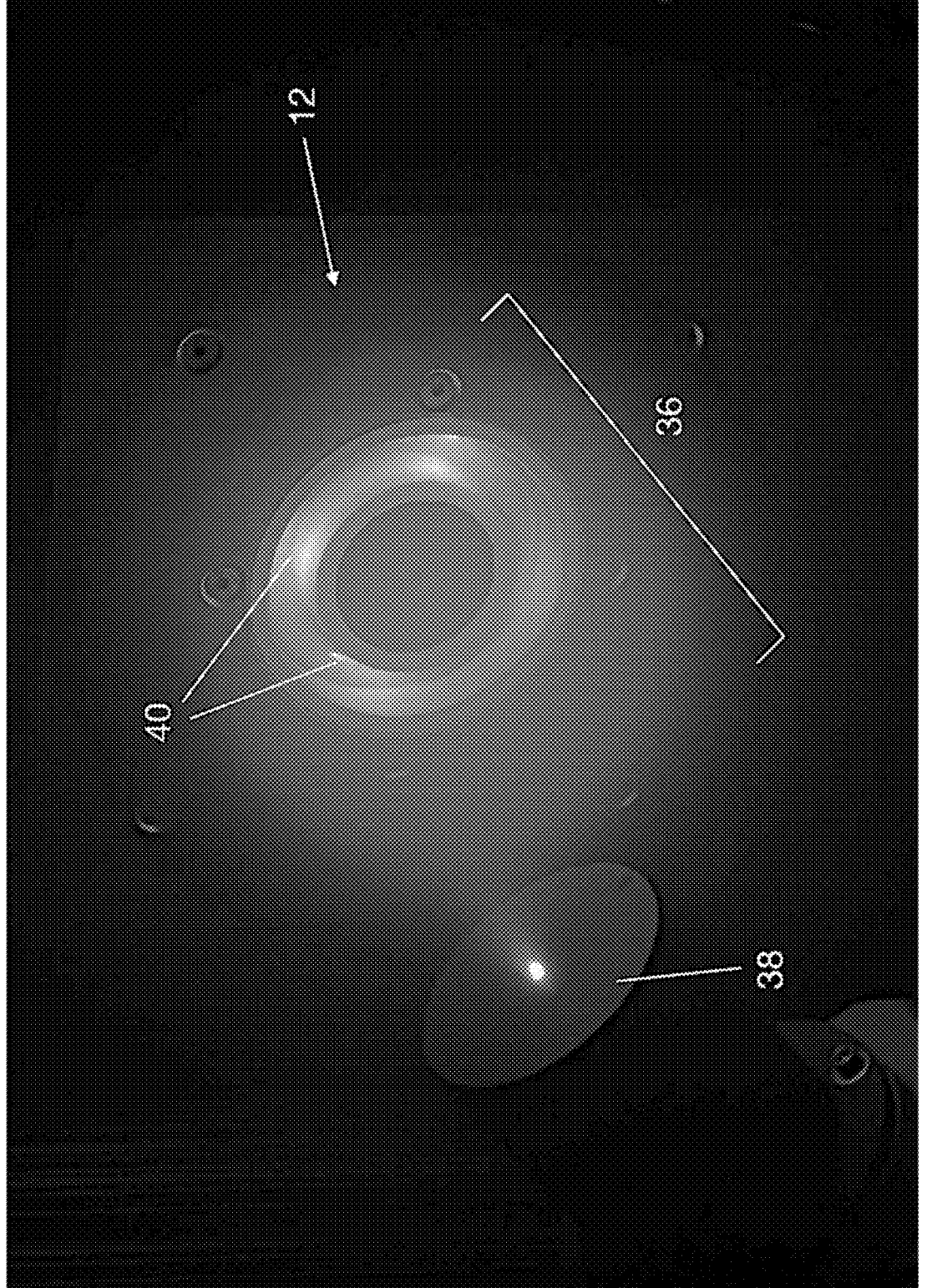
FIG. 11 is a photograph of a prototype of the Hall effect thruster system of FIGS. 8 and 9 during a live-fire test.

FIG. 11 is a photograph of the first embodiment being used during a live fire test of the system depicted in FIGS.

8 and 9. In this photograph a plasma discharge 36 sustained by a hollow cathode 38 can be seen emanating from the Hall effect thruster system 12 containing the first embodiment of the diffuser. Regions of higher plasma density (for example, 40) are brighter white in this figure. The regions of visually highest plasma density correspond to the exit holes of the diffuser, suggesting successful control over propellant injection trajectory.

Testing was performed at the MIT Space Propulsion Laboratory. During testing, the thruster system shown in FIG. 11 was affixed to a low-friction hanging pendulum in contact with a piezoresistive strain gauge configured within a Wheatstone bridge differential-voltage measurement circuit. During testing, thrust generation would press the pendulum against the gauge, causing a change in the Wheatstone bridge's differential-voltage that was measured by an analog-to-digital converter built into a microcontroller. Testing was performed with krypton gas propellant and the peak power achieved during testing was 200 W. Due to poor calibration and unexpected floating voltages within the sensor circuit, the thrust data collected was unable to be used to characterize the thruster. However, the operational voltages, currents, and propellant flow rates enabled upper bounds of thruster parameters to be calculated. At 60 W of operation the maximum thrust produced could be 10 mN, with a specific impulse of up to 1091 seconds. These parameters fall within expected orders of magnitudes for thrusters of similar scales, such as the SPT-50.

Figure 12:
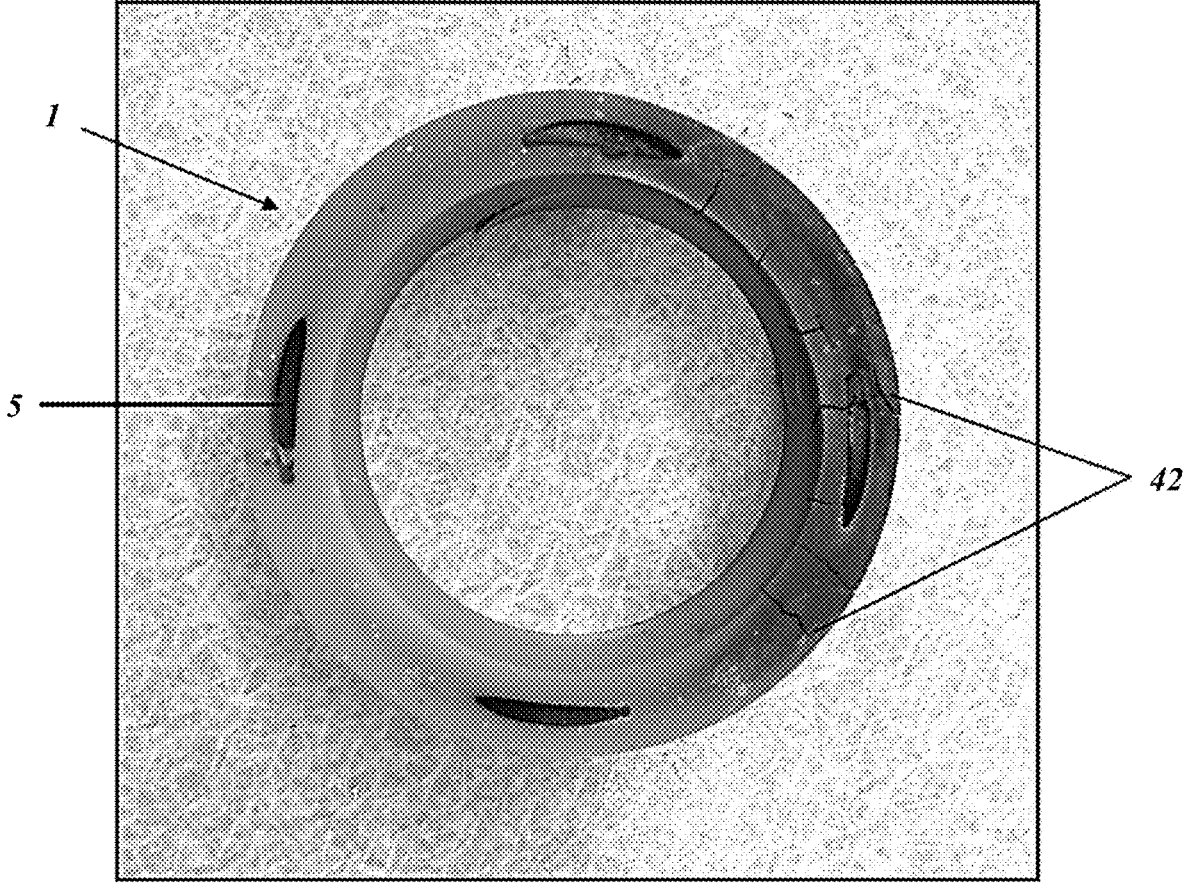
FIG. 12 is a photograph of the diffuser of the thruster system of FIG. 11 after the live-fire test.

FIG. 12 is a photograph of the first embodiment after being removed from the Hall effect thruster system 12 following the test depicted in FIG. 11. In this photograph the diffuser 1 is seen to have discoloration on its surface due to exposure to high temperatures. This discoloration is especially prominent in the exit holes 5. Additionally, stress fractures 42 likely due to thermal expansion from excessive contact with the channel walls are distinctly isolated to one side of the diffuser. Discoloration and stress fracturing will likely not be present for diffusers made from a different material, nonlimiting examples of which include aluminum, steel, and Hastelloy.

Example 2

Figure 13:
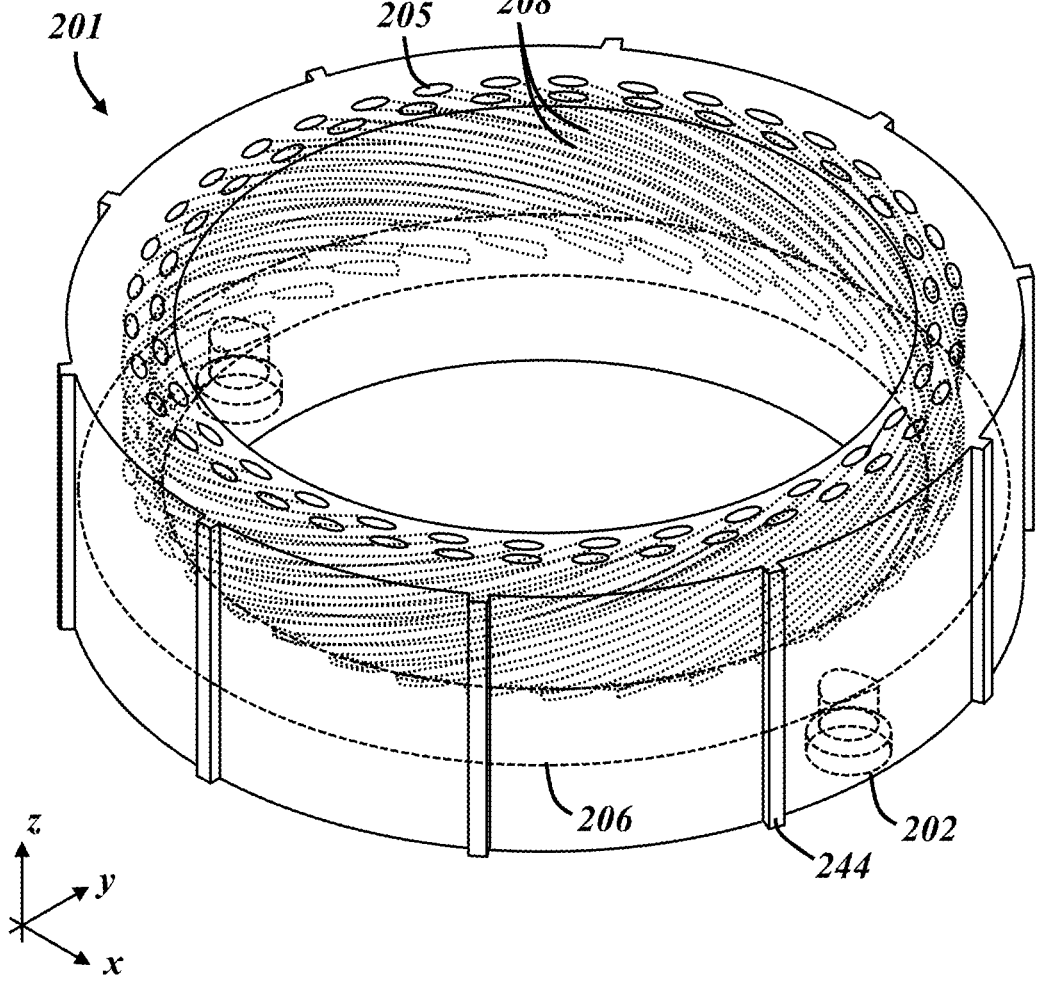
FIG. 13 is an isometric view of another embodiment of the diffuser for use in a Hall effect thruster system.

FIG. 13 depicts a third embodiment of a diffuser 201 which is similar to the first embodiment in that it was made of the same stereolithographic resin and contained a single toroidal plenum 206 and two inlet holes 202 but contains the addition of a plurality of ribs 244 around the outside wall of the diffuser and contains ninety outlet holes 205, to create more equal propellant distribution. The helical channels 208 in this embodiment have an angle of elevation of approximately 12.43 degrees. The ribs 244 were used to reduce thermal contact and therefore reduce the discoloration and stress fracturing seen in FIG. 12. This prototype was manufactured in order to perform live-fire and other thermal testing to evaluate the effectiveness of external ribs in reducing heat transport between the diffuser 201 and its surrounding channel walls 16. This test was successful in that ignition was achieved, a more equal propellant distribution was achieved, and stress fracturing did not occur.

Example 3

Figure 14:
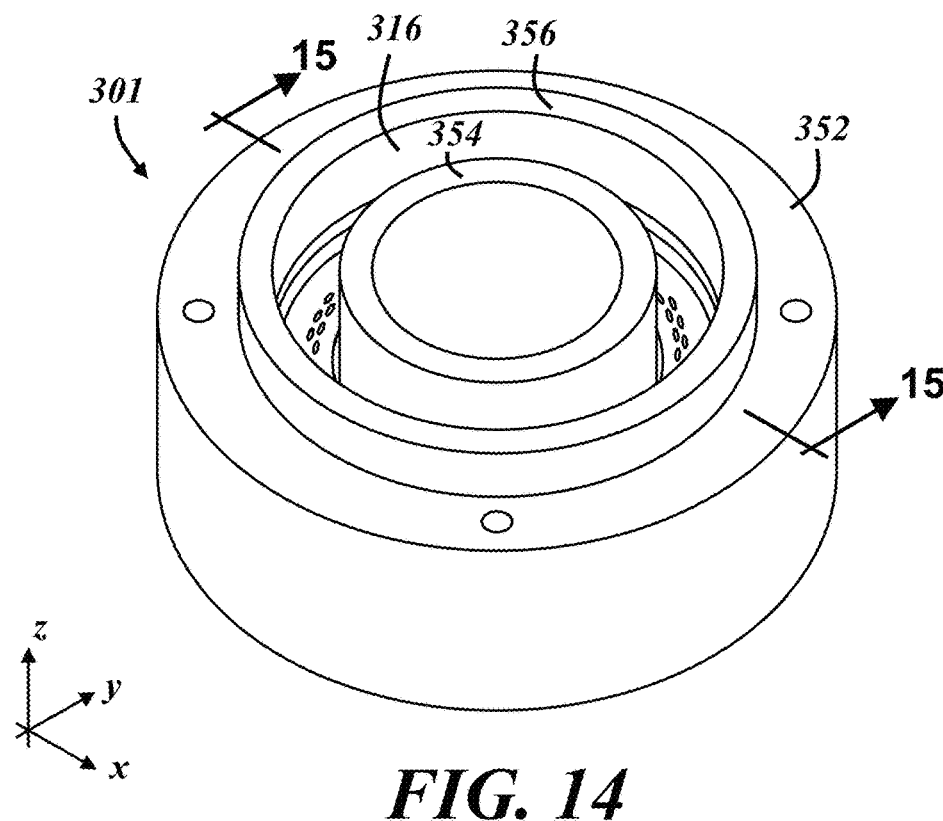
FIG. 14 is an isometric view of an embodiment of a thruster body for use in a Hall effect thruster system.
Figure 15:
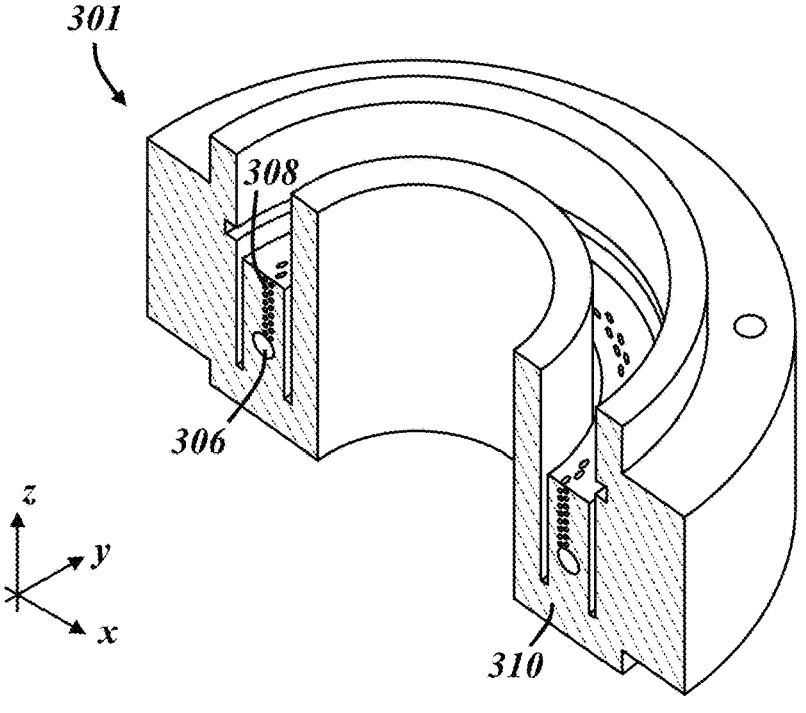
FIG. 15 is a cross-sectional isometric view of the thruster body of FIG. 14.

FIG. 14 depicts a fourth embodiment of a diffuser 301 in which the diffuser 301 and inner and outer walls 354, 356 defining the channel 316 of a Hall thruster system are 3D printed as a single part, sharing the same bulk material body 310. The diffuser 301 of FIG. 14 is made in the shape of the thruster body 52 of FIG. 9 and therefore can alternatively be considered as a thruster body 352 of a Hall thruster system that includes a Hall thruster channel 316 and a diffuser 301 formed as a single piece at the bottom of the channel 316. FIG. 15 depicts a section view of the fourth embodiment in which a toroidal plenum 306 and plurality of helical channels 308 are defined within the unibody diffuser-channel component 352. This embodiment was manufactured out of a stereolithographic epoxy resin in order to enable live-fire and other thermal testing to evaluate the effectiveness of stereolithographic epoxy resin as a Hall thruster channel wall material and the behavior of heat transport through the bulk material of a unified channel-diffuser component.

Example 4

FIG. 10 depicts the hollow flow geometry 115 of the second embodiment of the diffuser, in which two separate, rectangular-cross-section plenums 106 were used, rather than a single toroidal plenum. A simulation was run to investigate the trajectories and pressure gradients that may arise as an effect of having multiple, disconnected plenums, rather than plenums that fully circumnavigate the diffuser. It was found that diffusion occurred.

Prophetic Example 5

A diffuser similar to the diffuser in Example 1 is created in which notches or other cutouts are made along the outer or inner walls of the diffuser to allow for the routing of electrical cables. This is done to allow the routing of power connections to the thruster anode, central electromagnet, and/or hollow cathode. These notches or cutouts do not impact performance.

Prophetic Example 6

Diffusers similar to that of Example 1 are formed, but with an increased number of outlet holes. In one case, 50 outlet holes are used to increase even distribution of propellant. In the other case, 100 outlet holes are added to increase even distribution of propellant.

Prophetic Example 7

A diffuser similar to that of Example 1 is formed, but in which multiple stages of plenums stacked in the axial direction are included to control the pressure gradient within the diffuser. This is done to equalize pressures throughout the diffuser, further improving equal propellant distribution.

Prophetic Example 8

A diffuser similar to that of Example 1 is formed, but for which the radial thickness 13 of the diffuser is increased. This is done to increase surface contact between the diffuser and channel walls, increasing heat transport between the two surfaces and could be advantageous in conducting heat away from the diffuser.

Prophetic Example 9

A diffuser similar to that of Example 1 is formed, in which the radial thickness 13 of the diffuser is decreased. This is done to decrease surface contact between the diffuser and channel walls, reducing heat transport between the two surfaces. This can be advantageous in preventing excessive heat from conducting into the diffuser. This also can be done to enable the inclusion of additional components.

Prophetic Example 10

Diffusers similar to that of Example 2 are formed, but in which ribs are placed along the inner and/or outer walls of the diffuser. In one case, helical ribs are used. In another case, circumferential ribs are used. The ribs are included to reduce thermal conduction between the diffuser and the surrounding components. This also can be done to create cavities within which other components can be placed or to create geometries that allow for novel constraining features.

Prophetic Example 11

A diffuser similar to that of Example 2 is formed, but in which the radial width of the diffuser is reduced and the propellant outlet holes are distributed around the outer wall of the diffuser, rather than the top wall surface, so that propellant is distributed into the gap between the outer wall of the diffuser and the thruster channel wall. This is done to enable inclusion of a thruster anode that sits directly on the top surface of the diffuser and would cover outlet holes that might otherwise be placed on that surface.

Prophetic Example 12

A diffuser similar to that of Example 3 is formed in which the diffuser and thruster channel walls are manufactured as a single component, but the propellant outlet holes are distributed around the outer side wall of the thruster channel, as opposed to the bottom surface of the thruster channel, which corresponds to the top surface of the diffuser. This geometry is enabled by the diffuser and thruster channel walls being manufactured as a single component and is done to enable inclusion of an anode that sits directly on the top surface of the diffuser and would cover outlet holes that might otherwise be placed on that surface.

Prophetic Example 13

A diffuser similar to that of Example 1 is formed, but in which the top and/or bottom side walls of the diffuser are not flat plane surfaces. Convex or concave shapes may be used to accommodate anodes of greater surface area than a plane and to enable more complex propellant injection geometries.

Prophetic Example 14

A diffuser similar to that of Example 1 is formed in which the shape of the outer wall of the diffuser is not round or cylindrical. Diffusers using polyhedral or other closed shape geometries may be used in Hall thrusters of non-standard shapes, such as "racetrack" thrusters, or as a component within other electric propulsion systems besides Hall thrusters.

Prophetic Example 15

A diffuser similar to any of the aforementioned examples is formed, but in which the diffuser is manufactured out of more than one part and these parts are fused, fastened, clamped, or otherwise attached together to form a complete diffuser. This assembly process may be used in order to create diffusers with subtractive manufacturing techniques that would otherwise prevent a single-body diffuser from being manufactured.

Figure 16:
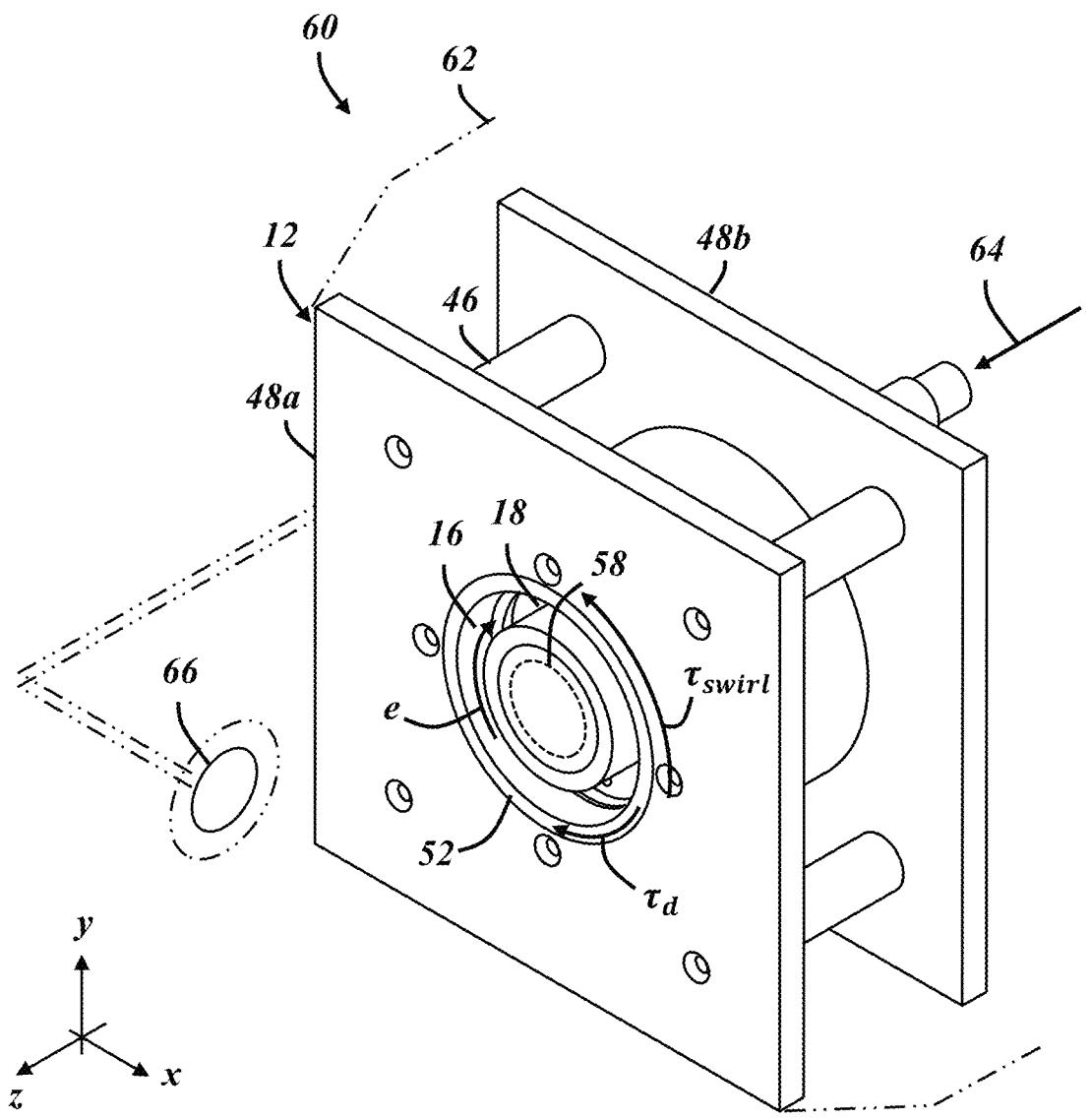
FIG. 16 is an isometric view of a portion of a spacecraft including an embodiment of the Hall effect thruster system of FIGS. 8 and 9.

FIG. 16 schematically depicts a portion of a spacecraft 60 that includes the Hall effect thruster system 12 of FIGS. 8 and 9, which itself includes one or more diffusers consistent with those described above. The thruster system 12 is affixed to a body 62 (shown in phantom) or some other structural member of the spacecraft 60, which may include any of a host of other components, including but not limited to a thruster propellant source 64, an electric power supply, photovoltaic cells, various sensors, communications devices, and controllers. The spacecraft 60 also includes an electron source 66, which may be in the form of a cathode that is axially spaced from the anode 18 of the thruster 12, as shown in FIG. 16. The electron source 66 may alternatively be provided as part of the thruster system 12—e.g., as an electrode configured for connection with an electric power source of the spacecraft 60. In one example, the electron source 66 is a center-mounted cathode as used in some modern thrusters. The basic operation of the thruster system 12 and how the above-described examples of diffusers can affect its operation are outlined below.

A Hall effect thruster system 12 generally operates by ionizing a propellant provided in the thruster channel 16 and then accelerating the ionized propellant out of the channel, the reaction force of which provides thrust. Several interrelated features are involved in this process, including an electric field across the thruster channel 16 in a first direction, a magnetic field across the thruster channel in a different second direction, an ionizable propellant in the thruster channel, and a Hall current in the thruster channel. In the illustrated example, the electric field is an axial field generated between the cathode 66 and the ring-shaped anode 18 at the bottom of the channel 16. The magnetic field is a radial field generated between opposite poles of the central electromagnet 58 and the surrounding set of electromagnets 46, for which one plate of the magnetic shunt 48 acts at the pole surrounding the channel 16.

The axial electric field attracts electrons and repels ions, while the magnetic field draws particles into orbits around magnetic field lines. The combined effect of these fields on charged particles is referred to as the Lorentz force, which induces a net particle motion in a direction perpendicular to the crossed electric and magnetic fields—i.e., in the azimuthal direction of the thruster channel 16. This motion is known as E×B drift, where E is the electric field and B is the magnetic field, and a drift velocity is calculable from the cross product of the electric and magnetic field strengths.

For purposes of the thruster system 12, the magnetic field strength is tuned so that electrons are strongly confined within the field and, thereby, within the channel 16, while ions are permitted escape. This differentiation between particles is possible due to the cyclotron radius of the ions being orders of magnitude larger than the cyclotron radius of the electrons. The confined electrons form a swirling azimuthal current in the thruster channel, which is referred to as the Hall current. This electron "swirl" is in the E×B direction. For a Hall thruster with a radially inward pointing magnetic field, the Hall current is a clockwise swirl, as indicated by reference character e in FIG. 16. For an outwardly pointing magnetic field, the Hall current is a counterclockwise swirl. It is important to note that E×B drift is charge-independent such that both electrons and ions swirl in the same azimuthal direction e. By Newton's third law, this redirection of particles in the e direction in the thruster channel 16 induces a torque $\tau_{swirl}$ on the thruster system 12 in the opposite direction—i.e. opposite the e direction of the Hall current.

The introduction of an ionizable propellant (e.g., xenon) into the channel 16 in which the Hall current is flowing leads to ionization of the propellant—i.e., dissociation of neutral propellant particles into a propellant cations and free electrons. The ions are repelled out of and away from the channel 16 by the electric field in a direction having an axial component, with the reaction force providing axial thrust in the opposite direction.

Only the electrons contribute to the overall Hall current—i.e., the current of electric charges in the channel 16—because they remain trapped in the thruster while the ions are ejected. Nevertheless, illustrative xenon propellant ions are six orders of magnitude more massive than electrons, so the majority of the swirl torque $\tau_{swirl}$ is induced by ion movement within the plasma in the channel 16, even though the ions are in the channel 16 for only a short time. The ion trajectories are highly complex, so their impact on swirl torque is difficult to calculate exactly. Furthermore, the magnitude of swirl torque is so small that it has not been directly measured on Earth, though active research is underway building instruments sensitive enough to measure it. A measurement has been made for the PPS-1350 thruster on the SMART-1 mission (60 μN-m), and prior simulation of the SPT-100 and SPT-140 thrusters yielded 51 and 267 μN-m, respectively.

While swirl torque $\tau_{swirl}$ is an unavoidable phenomenon in Hall effect thrusters, its effect on Earth-orbit objects (e.g., satellites) has been relatively easy to mitigate. Momentum/reaction wheels can be employed to effectively "absorb" swirl torque as it is generated. Periodically, angular momentum may be offloaded from reaction wheels by firing thrusters or employing magnetorquers to push against Earth's magnetic field in a process known as desaturation. An alternate mitigation strategy involves locating a Hall effect thruster on an actuator so that its angle can be adjusted throughout an orbit. Because Earth orbits are closed, swirl torque can be counteracted by clever adjustments to the thruster and spacecraft attitude throughout an orbit in a process called "spiral thrusting." In deep space applications, however, the lack of a closed orbits and planetary magnetic fields make it difficult to offload swirl torque without dramatic desaturation maneuvers or special thrusters designated for desaturation. The latter approach is typically avoided because of the increased cost and complexity of adding an additional propulsion system, and the former approach is not ideal because it requires expenditure of additional propellant and loss of forward thrusting time. In theory, the swirl torque can be counteracted by reversing the polarity of the electromagnets generating the magnetic field. In practice, however, this can lead to accelerated channel wall erosion thereby reducing thruster lifetime.

The above-described diffuser offers an alternative mitigation strategy, which is a configuration that, upon ejection of propellant into the thruster channel, applies a net torque to the thruster system 12 in a direction opposite the swirl torque induced by the Hall current. In other words, the thruster system 12 can be constructed such that the Hall effect-induced swirl torque $\tau_{swirl}$ is in a known first rotational direction—e.g., counterclockwise as in FIG. 16—and such that ejection of the propellant from the diffuser applies a counter-torque Ta in a second rotational direction opposite the first rotational direction, as illustrated in FIG. 16. As oriented in FIG. 16, the direction e=E×B of the Hall current is clockwise, the resulting swirl torque $\tau_{swirl}$ is counterclockwise, and the applied counter-torque $\tau_d$ is clockwise as a

13 result of the direction of the ejection velocity V of the propellant from the diffuser, as illustrated in FIGS. 3 and 4. The disclosed diffuser thus provides improved residence time of the ionizable propellant in the thruster channel 16 while additionally providing a counter-torque that at least partially counteracts the Hall thruster swirl torque.

Embodiments of the Hall effect thruster system 12 may thus include a thruster body 52 and a diffuser 1 configured to eject ionizable propellant into an annular channel 16 formed in the thruster body. A Hall current provided in the annular thruster channel 16 induces a torque $\tau_{swirl}$ on the thruster body 52 in a first rotational direction, and ejection of the propellant from the diffuser 1 applies a counter-torque $\tau_d$ to the thruster body in a second rotational direction opposite the first rotational direction. The diffuser 1 may be configured to eject the propellant into the annular channel 16 with a tangential velocity—e.g., a velocity tangent to one of the above-described helical diffuser channels 8. Notably, application of the counter-torque $\tau_d$ is not limited to ejection of the propellant from helical diffuser channels. Any diffuser channel shape that results in application of a net torque $\tau_d$ opposite in direction from the swirl torque $\tau_{swirl}$ may be employed. The diffuser channels 8 could all be simply inclined with respect to the central axis A, for example, and need not eject the propellant into the thruster channel 16 with tangential velocity—i.e., only a component of the ejection velocity need be tangential.

However, while it may be possible to impart a counter-torque on the thruster body 52 via inclined rectilinear (non-curved) diffuser channels 8, curvilinear channels such as the helical channels of the diffusers of FIGS. 1-5 and 13-15 may be preferred along with tangential ejection velocity to maximize the applied counter-torque and provide the propellant with angular momentum prior to ejection from the diffuser. In any case, the counter-torque is applied without expending additional spacecraft resources and can be applied in deep space application where a closed orbital path and/or a planetary magnetic field is not available. The counter-torque is also applied without reversing the polarity of the magnetic field generated by the thruster system 12.

While the magnitude of the counter-torque $\tau_d$ that can be produced is difficult to predict or calculate accurately, the discussion below provides additional information on possible parameters and features of the diffuser and thruster system that can affect its magnitude, along with some rough estimates.

There are two key interactions that contribute to diffuser torque $\tau_d$. The first interaction is the propellant being ejected from the openings at the outlet end of the diffuser. This directly imparts a torque $\tau_{azi}$ about the central axis A of the diffuser. The second interaction is the propellant colliding with walls of the channel before being ionized. This collision transfers some of the momentum back into the thruster body, effectively canceling out a portion of the torque ejection torque $\tau_{azi}$.

The torque imparted by propellant ejection can be modeled by the equation $$\tau_{azi} = r_o \dot{m} \sqrt{\frac{8k_B T_i}{\pi m}} \cos(\theta)\eta_d, \tag{1}$$

where $r_o$ is the radius from the propellant exit orifice of the diffuser to the central axis A of the thruster, $\dot{m}$ is the propellant mass flow rate, $k_B$ is Boltzmann's constant, $T_i$ is the incident temperature of the propellant in Kelvin, m is the mass of a propellant particle, $\theta$ is the angle of ejection with respect to a radial plane (see FIG. 4), and $\eta_d$ is a divergence efficiency term that scales down the torque as a result of the flow diverging as it leaves the diffuser orifice. The ejection torque $\tau_{azi}$ is thus proportional to mass flow rate, temperature, and ejection angle. Accordingly, increased ejection torque $\tau_{azi}$ follows from a reduced ejection angle $\theta$, increased mass flow rate $\dot{m}$, and/or increased propellant temperature $T_i$.

From here, a rough order of magnitude estimate can be made. Reasonable estimates for the values in Eq. 1 for a xenon-propelled SPT-140 Hall thruster as used in the NASA Psyche mission yields $\tau_{azi} \approx 10$ µNm, for a divergence efficiency of 50%. TABLE I lists order of magnitude estimated values for injection torque parameters.

TABLE I

| Variable | Order | Unit |
|---|---|---|
| $r_o$ | $10^{-2}$ | m |
| $\dot{m}$ | $10^{-5}$ | kg/s |
| $k_B$ | $10^{-23}$ | J/K |
| m | $10^{-25}$ | kg |
| $T_i$ | $10^2$ | K |
| $\cos \theta$ | $10^0$ | — |
| $\eta_d$ | $10^{-1}$ | — |

Assuming rarefied propellant flow, the net torque on a channel wall by a propellant particle is given by $$\tau_{wall} = r_w A_{eff} [\alpha(\phi_i - \phi_{r,d}) + (1 - \alpha)(\phi_i - \phi_{r,s})], \tag{2}$$

where $r_w$ is the radius from the wall to the central axis A, $A_{eff}$ is the effective wall surface area over which the torque is acting, $\alpha$ is the diffuse accommodation coefficient, $\phi_i$ represents the momentum flux incident on the wall, $\phi_{r,d}$ represents the diffuse contribution of reflected momentum flux, and $\phi_{r,s}$ represents the specular contribution of reflected momentum flux. The momentum fluxes are given as $$\phi_i = \phi_{r,s} = n_i k_B T_i \left\{ \frac{\hat{u}_3}{\sqrt{\pi}} e^{-\hat{u}_3^2} + \left(\frac{1}{2} + \hat{u}_3^2\right)[1 + \text{erf}(\hat{u}_3)] \right\} \tag{3}$$

$$\phi_{r,d} = n_i \sqrt{\frac{T_i}{T_w}} \left\{ \hat{u}_3 \sqrt{\pi} [1 + \text{erf}(\hat{u}_3)] + e^{-\hat{u}_3^2} \right\}$$

$$k_B T_w \left\{ \frac{\hat{u}_3}{\sqrt{\pi}} e^{-\hat{u}_3^2} + \left(\frac{1}{2} + \hat{u}_3^2\right)[1 + \text{erf}(\hat{u}_3)] \right\}, \tag{4}$$

where $n_i$ is the incident number density of particles, $T_w$ is the channel wall temperature, and the reduced velocity $\bar{u}_3$ is given by $$\hat{u}_3 = \sqrt{\frac{m}{2kT}} u_i \cos \beta, \tag{5}$$

where $\bar{u}_i$ is the average incident speed and $\beta$ is the angle of incidence with the wall. The above equations are highly nonlinear. Nevertheless a rough order of magnitude estimate can be made.

For the values listed in TABLE II, $\phi_i$ and $\phi_{r,d}$ are on the order of $10^{-4}$, with $\phi_i > \phi_{r,d}$.

TABLE II

| Variable | Order | Unit |
| --- | --- | --- |
| $r_w$ | $10^{-2}$ | m |
| $A_{eff}$ | $10^{-3}$ | $m^2$ |
| $\alpha$ | $10^{-1}$ | — |
| $\bar{u}_3$ | $10^{-1}$ | m/s |
| $erf(\bar{u}_3)$ | $10^{-1}$ | — |
| $T_i/T_w$ | $1/2$ | K |
| $n_i$ | $10^{18}$ | $m^{-3}$ |

A very rough estimate for the wall torque $\tau_{wall}$ is therefore $\tau_{wall} \approx 10^{-2}$ $\mu$Nm, which is two orders of magnitude smaller than the estimated ejection torque injection torque $\tau_{azi}$. Assuming the propellant experiences only one wall collision before ionization, the net torque applied on the system by the ejection of propellant from the diffuser is $$\tau_d = \tau_{azi} - \tau_{wall}. \qquad (6)$$

If subsequent wall collisions occur before ionization, additional $\tau_{wall}$ interactions would need to be subtracted in Eq. 6. However, it appears from the above estimates that $\tau_{wall} \ll \tau_{azi}$, such that many wall collisions would be required to make a significant difference. After ionization occurs, the ions are accelerated quickly out of the thruster body, and wall interactions can likely be ignored.

Based on the above estimates, the counter-torque $\tau_d$ exerted by the propellant diffuser on the thruster body is on the order of 10 $\mu$Nm. The NASA Psyche mission estimated its swirl torque $\tau_{swirl}$ to be 267 $\mu$Nm, meaning a gas diffuser as configured above—i.e., where the ejection velocity V is tangential and the ejection angle approaches zero (e.g. $\theta < 10°$)—can offset approximately 3.7% of the Psyche swirl torque. If the diffuser parameters include an ejection angle $\theta = 10°$ and a divergence efficiency $\eta_d = 90\%$, the amount of counter-torque $\tau_d$ can be increased to approximately 12% of swirl torque. If the propellant is further pre-heated to a temperature of 500 K prior to ejection, this can be raised to 15.6%. Based on these estimates, it is believed that a counter-torque $\tau_d$ in a range between 10% and 20% of a Hall current induced swirl torque $\tau_d$ can be achieved.

While it is not entirely known what factors most affect divergence efficiency, shrinking the size of the orifice propellant outlet orifices (e.g., smaller diameter propellant channels) and increasing the mass flow rate may force the propellant gas out of the rarefied regime into a translational or fluid regime that would reduce jet divergence and increase the efficiency parameter. However, the near-vacuum condition in the thruster channel makes it difficult to determine a true maximum achievable efficiency term.

Consistent with the above description, embodiments of a method of operating a spacecraft 60 including a Hall effect thruster system 12 include ejecting an ionizable propellant into an annular thruster channel 16 of the system in a direction that counteracts a torque induced on the thruster system by a Hall current provided in the annular channel. As noted above, the propellant can be ejected into the thruster channel 16 from a diffuser 1, and the diffuser may be configured so that the direction of propellant ejection has a tangential component or is a tangential direction. The direction of propellant ejection can be defined at least in part by the shape of the propellant channels 8 formed in the diffuser body 10, which is preferably helical or otherwise curvilinear.

It is to be understood that the foregoing description is of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A Hall effect thruster system comprising a thruster body and a diffuser configured to eject ionizable propellant into an annular channel formed in the thruster body,
the system further comprising curvilinear propellant channels formed through a body of the diffuser, each propellant channel having an inlet end that receives the ionizable propellant and an outlet end from which the propellant is ejected into the annular channel,
wherein the inlet end and the outlet end of each propellant channel are axially spaced apart in the direction of a central axis of the diffuser, and
wherein a Hall current provided in the annular channel induces a torque on the thruster body in a first rotational direction, and ejection of the propellant from the diffuser applies a counter-torque to the thruster body in a second rotational direction opposite the first rotational direction.

2. The system of claim 1, wherein the diffuser ejects the propellant into the annular channel with a tangential velocity.

3. The system of claim 1, wherein the curvilinear channels are helical channels.

4. The system of claim 1, wherein the diffuser is located in the annular channel and is formed as a single continuous piece with the thruster body.

5. The system of claim 1, wherein the counter-torque is applied to the thruster body without reversing a polarity of a magnetic field containing the Hall current in the annular channel.

6. A spacecraft comprising the system of claim 1.

7. The system of claim 1,
wherein the system is configured to generate a radial magnetic field across the annular channel such that the Hall current flows in the second rotational direction, and
wherein the outlet end of each propellant channel is spaced from the inlet end of the respective propellant channel in the first rotational direction.

8. The system of claim 7, wherein the magnetic field is radially inward pointing such that the second rotational direction is a clockwise direction and the first rotational direction is a counterclockwise direction as viewed from an open end of the annular channel.

9. The system of claim 7, wherein the magnetic field is radially outward pointing such that the first rotational direction is a clockwise direction and the second rotational direction is a counterclockwise direction as viewed from an open end of the annular channel.

10. A Hall effect thruster system comprising a thruster body and a diffuser configured to eject ionizable propellant into an annular channel formed in the thruster body in a direction that applies a counter-torque on the thruster body in a rotational direction that is opposite a rotational direction of a torque induced on the thruster body by a Hall current in the annular channel, the system further comprising curvilinear propellant channels formed through a body of the diffuser, each propellant channel having an inlet end that receives the ionizable propellant and an outlet end from which the propellant is ejected into the annular channel, wherein the inlet end and the outlet end of each propellant channel are axially spaced apart in the direction of a central axis of the diffuser, and wherein the diffuser ejects the propellant into the annular channel with a tangential velocity to apply said counter-torque, the velocity being tangential to a circle that is concentric with the annular channel.

11. The system of claim 10, wherein the curvilinear channels are helical channels.

12. The system of claim 10, wherein the diffuser is affixed to the thruster body in the annular channel and does not rotate with respect to the thruster body.

13. The system of claim 10, wherein the diffuser is located in the annular channel and is formed as a single continuous piece with the thruster body.

14. The system of claim 10, wherein the counter-torque is applied to the thruster body without reversing a polarity of a magnetic field containing the Hall current in the annular channel.

15. A spacecraft comprising the system of claim 10.

16. A method of operating a spacecraft comprising the Hall thruster system of claim 10, the method comprising ejecting the ionizable propellant into the annular channel of the system in said direction that applies the counter-torque to counteract the torque induced on the thruster system body by the Hall current provided in the annular channel.

17. The method of claim 16, wherein the step of ejecting includes ejecting the propellant from a helical channel of the diffuser of the thruster system.

* * * * *